(12) United States Patent
Tabata

(10) Patent No.: US 8,145,421 B2
(45) Date of Patent: Mar. 27, 2012

(54) FACILITY SEARCHING DEVICE, FACILITY SEARCHING METHOD, AND VEHICLE-MOUNTED NAVIGATION APPARATUS

(75) Inventor: Kazuya Tabata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1051 days.

(21) Appl. No.: 10/370,576

(22) Filed: Feb. 24, 2003

(65) Prior Publication Data

US 2003/0171871 A1    Sep. 11, 2003

(30) Foreign Application Priority Data

Mar. 6, 2002 (JP) .................................. 2002-60828

(51) Int. Cl.
*G01C 21/00* (2006.01)
(52) U.S. Cl. ........................ 701/408; 340/990
(58) Field of Classification Search .................. 701/200, 701/210, 201, 209, 211, 207, 208, 400, 410, 701/408, 438, 440, 441, 451, 461, 467, 468; 340/995.12, 995.24, 988, 990, 995.14
See application file for complete search history.

(56) References Cited

U.S. PATENT DOCUMENTS

| | | | |
|---|---|---|---|
| 6,038,508 A * | 3/2000 | Maekawa et al. | 701/207 |
| 6,041,281 A * | 3/2000 | Nimura et al. | 701/211 |
| 6,061,003 A * | 5/2000 | Harada | 340/995.15 |
| 6,128,571 A * | 10/2000 | Ito et al. | 701/201 |
| 6,178,377 B1 * | 1/2001 | Ishihara et al. | 701/200 |
| 6,333,702 B1 * | 12/2001 | Hiyokawa et al. | 340/995.21 |
| 6,374,180 B1 * | 4/2002 | Slominski et al. | 701/208 |
| 6,427,118 B1 * | 7/2002 | Suzuki | 701/209 |

FOREIGN PATENT DOCUMENTS

| | | |
|---|---|---|
| CN | 1161098 A | 10/1997 |
| JP | 04-062418 A | 2/1992 |
| JP | 9-119846 A | 5/1997 |
| JP | 9-210696 A | 8/1997 |
| JP | 9-210715 A | 8/1997 |
| JP | 10-30931 A | 2/1998 |
| JP | 11-211500 | 8/1999 |

OTHER PUBLICATIONS

"Electronic Map of Beijing", English translation of product briefing, Article in Chinese, pp. 1-24.

* cited by examiner

*Primary Examiner* — Dalena Tran
(74) *Attorney, Agent, or Firm* — Birch, Stewart, Kolasch & Birch, LLP.

(57) ABSTRACT

A facility searching device includes a road selecting unit for selecting an arbitrary road from road data stored in a storage unit, and a road facility searching unit for searching for facilities located along the road selected by the road selection unit. Therefore, the facility searching device can search for facilities located along an arbitrary road by allowing users to select the arbitrary road regardless of whether or not a route is provided.

16 Claims, 5 Drawing Sheets

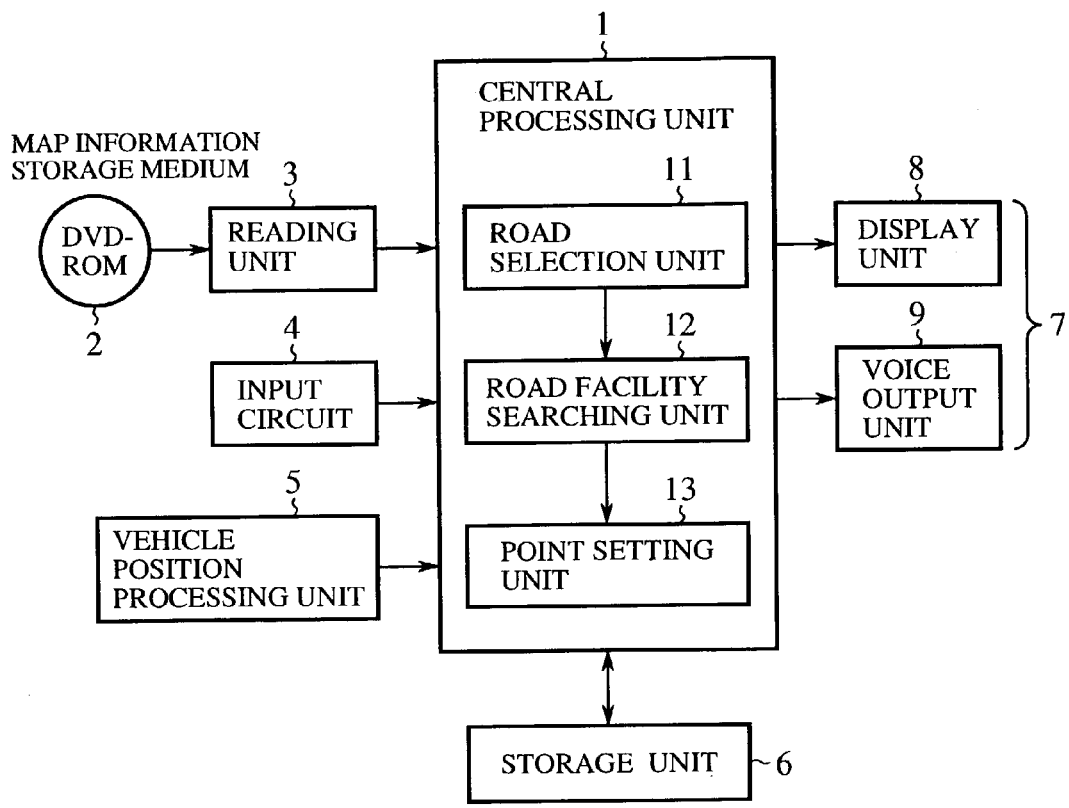
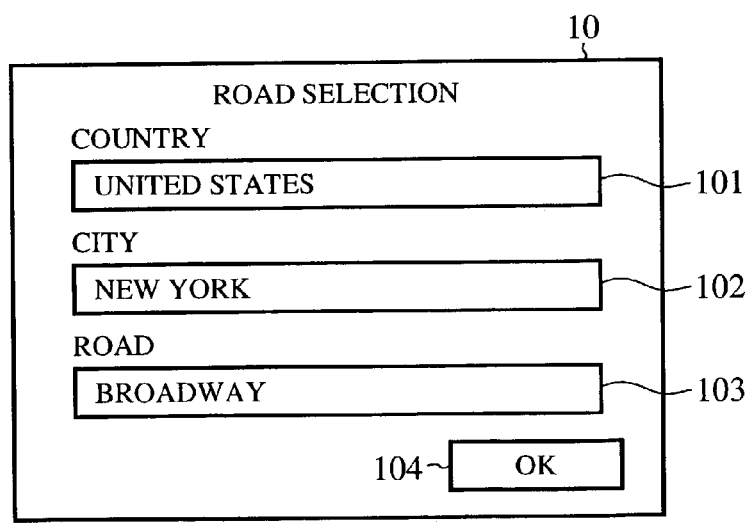

FACILITY SEARCHING DEVICE, FACILITY SEARCHING METHOD, AND VEHICLE-MOUNTED NAVIGATION APPARATUS

This nonprovisional application claims priority under 35 U.S.C. §119(a) on Patent Application No. 2002-060828 filed in JAPAN on Mar. 6, 2002, which is herein incorporated by reference.

BACKGROUND OF THE INVENTION

1. Field of the Invention

The present invention relates to a facility searching device for and a facility searching method of searching for facilities located along an arbitrary road (or street) by allowing users to select the arbitrary road, and a vehicle-mounted navigation apparatus that employs the facility searching device.

2. Description of Related Art

Conventionally, various facility searching methods of searching for facilities located along a road are proposed for use in a vehicle-mounted navigation apparatus that determines the current position of a vehicle that is traveling along the road, displays the current position of the vehicle on the screen thereof, and also displays a route to a destination on the screen thereof. For example, Japanese patent application publication (TOKKAIHEI) No. 10-30931 discloses a method of searching for facilities located along a road where the current position of the vehicle exists and facilities located along roads connected to the former road, for calculating the distance from the current position of the vehicle to each of the facilities searched for, and for displaying the direction in which the vehicle is headed and the current position of the vehicle on an on-screen map as well as the facilities, such as stores, searched for and located in the vicinity of the vehicle.

In accordance with the above-mentioned prior art facility searching method, while only facilities located in the direction in which the vehicle is headed and which is extending from the current position of the vehicle can be searched for, the user cannot specify an arbitrary road in order to search for facilities located along the arbitrary road by using the method. Furthermore, when no data on facilities located in the direction of travel exists as a result of searching, the method can only notify the user that no facility doesn't exist in the direction of travel by producing a telop display or the like and therefore the user has no alternative but to take measures against the fact that no facility cannot be found by himself or herself. A method of determining the locations of facilities located in the direction in which the vehicle is headed is also disclosed. However, a problem encountered with this method is that when the road along which the vehicle is traveling has a crash barrier, the user cannot accurately know the locations of facilities located in the direction in which the vehicle is headed.

SUMMARY OF THE INVENTION

The present invention is proposed to solve the above-mentioned problems, and it is therefore an object of the present invention to provide a facility searching device for and a facility searching method of being able to search for facilities located along an arbitrary road by allowing users to select the arbitrary road regardless of whether or not a route is provided, and a vehicle-mounted navigation apparatus provided with the facility searching device.

In accordance with an aspect of the present invention, there is provided a facility searching device including a road selecting unit for selecting an arbitrary road from road data stored in a storage unit; and a road facility searching unit for searching for facilities located along the road selected by the road selection unit.

Therefore, the facility searching device can search for facilities located along an arbitrary road by allowing users to select the arbitrary road regardless of whether or not a route is provided.

In accordance with another aspect of the present invention, there is provided a facility searching method including the steps of: selecting an arbitrary road from road data stored in a storage unit; and searching for facilities located along the road selected in the road selecting step.

In accordance with a further aspect of the present invention, there is provided a vehicle-mounted navigation apparatus including: a facility searching device provided with a road selecting unit for selecting an arbitrary road from road data stored in a storage unit and a road facility searching unit for searching for facilities located along the road selected by the road selection unit; a vehicle position determination unit for determining a current position of a vehicle; an input unit for inputting information from the facility searching device and information from the vehicle position determination unit; and a display unit for displaying the information from the facility searching device and the information from the vehicle position determination unit.

Therefore, the vehicle-mounted navigation apparatus can search for facilities located along an arbitrary road by allowing users to select the arbitrary road regardless of whether or not a route is provided, and the navigation performance of the vehicle-mounted navigation apparatus can be improved.

Further objects and advantages of the present invention will be apparent from the following description of the preferred embodiments of the invention as illustrated in the accompanying drawings.

BRIEF DESCRIPTION OF THE DRAWINGS

FIG. 1 is a block diagram showing the structure of a vehicle-mounted navigation apparatus provided with a facility searching device according to an embodiment of the present invention;

FIG. 3 is a road selection screen displayed by a display unit of the vehicle-mounted navigation apparatus;

DETAILED DESCRIPTION OF THE PREFERRED EMBODIMENT

Figure 2:
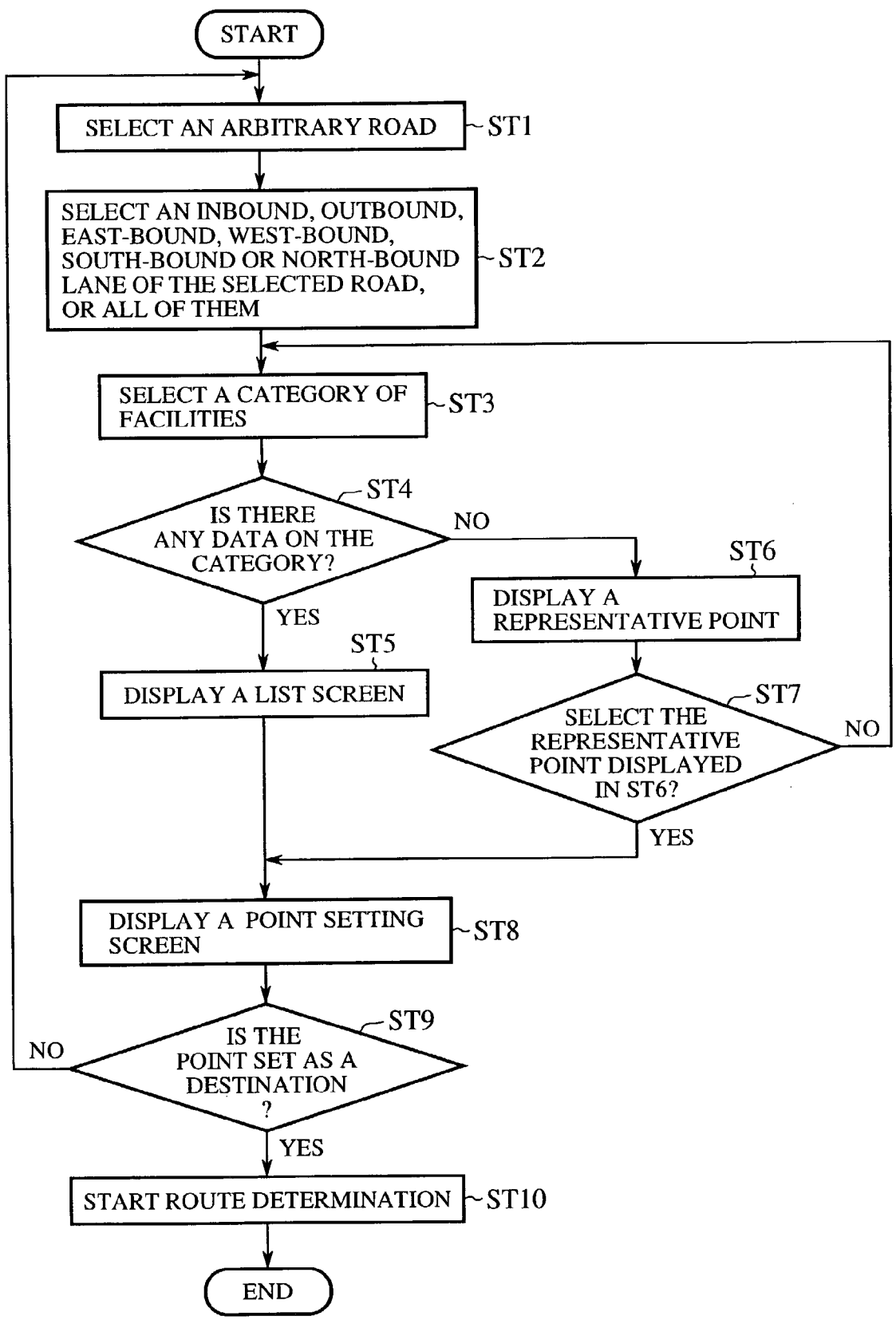
FIG. 2 is a flowchart showing an operation of the facility searching device according to an embodiment of the present invention.

The invention will now be described with reference to the accompanying drawings.

Embodiment 1

FIG. 1 is a block diagram showing the structure of a vehicle-mounted navigation apparatus provided with a facility searching device according to the present invention. In the figure, reference numeral 1 denotes a central processing unit (CPU), reference numeral 2 denotes a map information storage medium that is a DVD-ROM, a CD-ROM, or the like, reference numeral 3 denotes a reading unit for reading data from the map information storage medium 2, reference numeral 4 denotes an input unit such as a switch, reference numeral 5 denotes a vehicle position processing unit such as a GPS, reference numeral 6 denotes a storage unit, and reference numeral 7 denotes an output unit that consists of a display unit 8, such as a liquid crystal display, and a voice output unit 9 for providing guidance by voice.

The map information storage medium 2 stores road data including the names of all roads each having a name and the coordinates of line segments and digital road data on facilities, such as gas stations, convenience stores, restaurants, fast food shops, and dealers, and communal facilities which are located along each road. The storage unit 6 stores some programs that define various processes which are performed by the central processing unit 1. The central processing unit 1 is provided with a road selection unit 11, a road facility searching unit 12, and a point setting unit 13 which are implemented via programs, respectively.

Next, a description will be made as to an operation of the vehicle-mounted navigation apparatus. FIG. 2 is a flow chart showing the operation of the facility searching device of the present invention, and FIGS. 3 to 9 show examples of display screens. First of all, the road selection unit 11 of the facility searching device allows the user to select an arbitrary road by inputting the names of a country, a city and a road on a road selection screen 10 as shown in FIG. 3 (in step ST1). In the example of FIG. 3, the user inputs United States as country's name 101, New York as city's name 102, and Broadway as road's name 103. When the map information storage medium 2 stores only the name of each road, even if the user does not know the names of a country and a city including a target road that the user is going to select, the facility searching device can search for the target road by inputting only the road's name (i.e., by selecting the road's name stored in the map information storage medium 2 by using the input unit such as a switch). When there are some roads having the same name as the road's name, the road selection unit 11 of the facility searching device can search for the target road promptly and accurately by searching for a country and a city including the target road.

Figure 4:
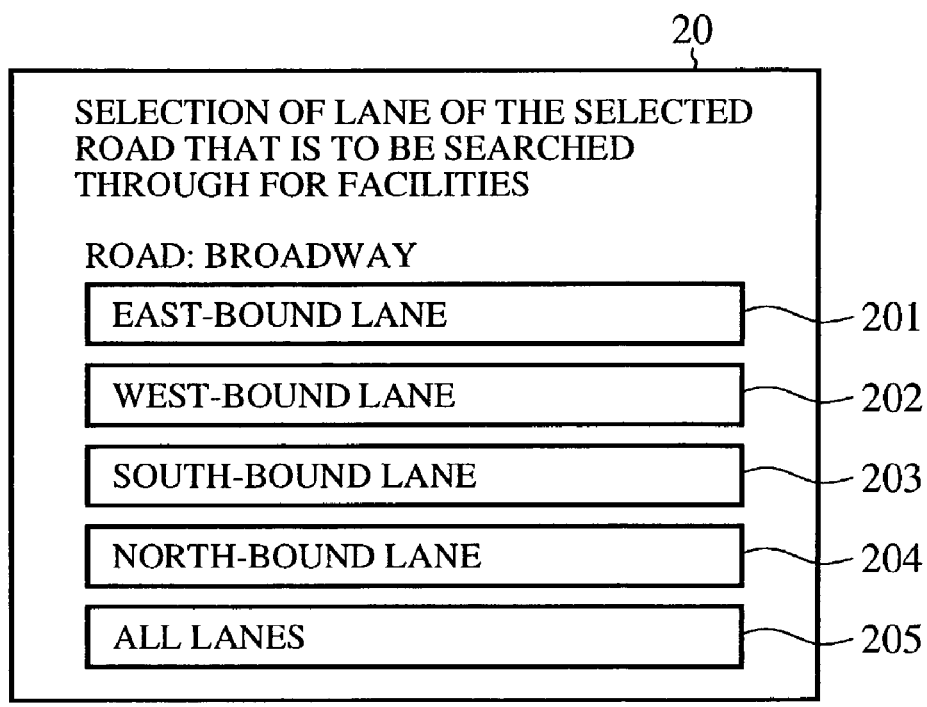
FIG. 4 is a road direction selection screen displayed by the display unit of the vehicle-mounted navigation apparatus.
Figure 5:
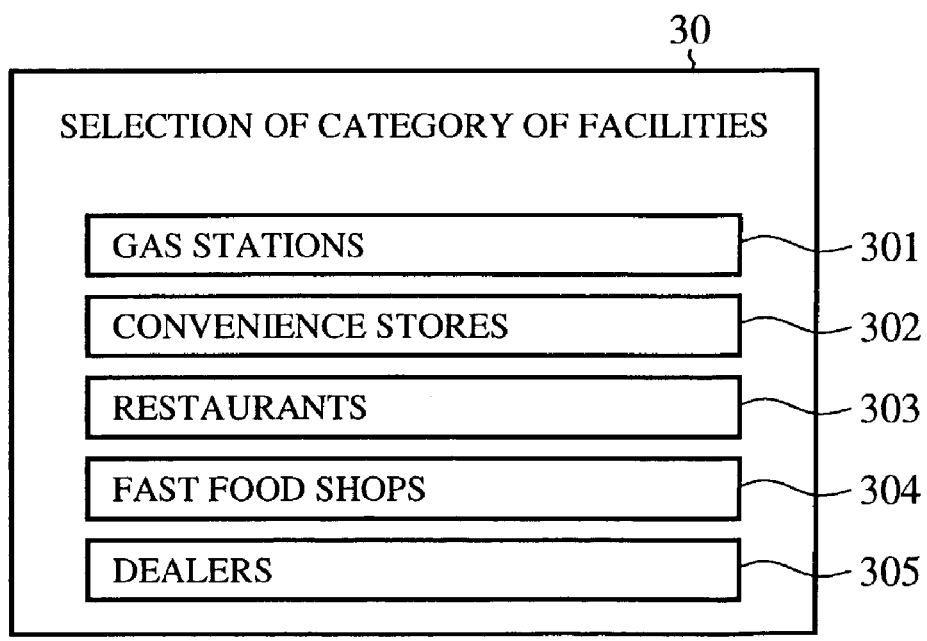
FIG. 5 is a facility category selection screen displayed by the display unit of the vehicle-mounted navigation apparatus.

When the user pushes an on-screen button 104 representing "OK" after selecting an arbitrary road, the road facility searching unit 12 of the facility searching device displays a road lane selection screen 20, as shown in FIG. 4, on the screen of the vehicle-mounted navigation apparatus. In this example, five buttons 201 to 205 that respectively represent "Search for facilities along the road east (i.e., east-bound lane)", "Search for facilities along the road west (i.e., west-bound lane)", "Search for facilities along the road south (i.e., south-bound lane)", "Search for facilities along the road north (i.e., north-bound lane)", and "Search for facilities along all lanes" are displayed. When the user specifies a certain lane of the selected road by, in step ST2, pushing either of the four on-screen buttons 201 to 204 representing an east-bound lane, west-bound lane, south-bound lane, and north-bound lane, respectively, the road facility searching unit 12 of the facility searching device displays the categories of facilities located in the selected lane of the road, i.e., along the road east, west, south or north, as shown in FIG. 5. When the user, in step ST2, pushes the fifth on-screen button 205 representing "all lanes of the road", the road facility searching unit 12 of the facility searching device displays the categories of facilities located in all lanes of the selected road.

The road facility searching unit 12 of the facility searching device can also display two buttons representing an inbound lane and an outbound lane of the selected arbitrary road, respectively, in addition to the five buttons 201 to 205, so that the user can select the inbound or outbound lane of the selected arbitrary road to cause the facility searching device to search for facilities located along the inbound or outbound lane of the selected arbitrary road. The inbound lane of a road unit a lane leading to a big city such as the capital city of a state, and the outbound lane of a road unit a lane that is extending opposite to the direction of the inbound lane.

Figure 6:
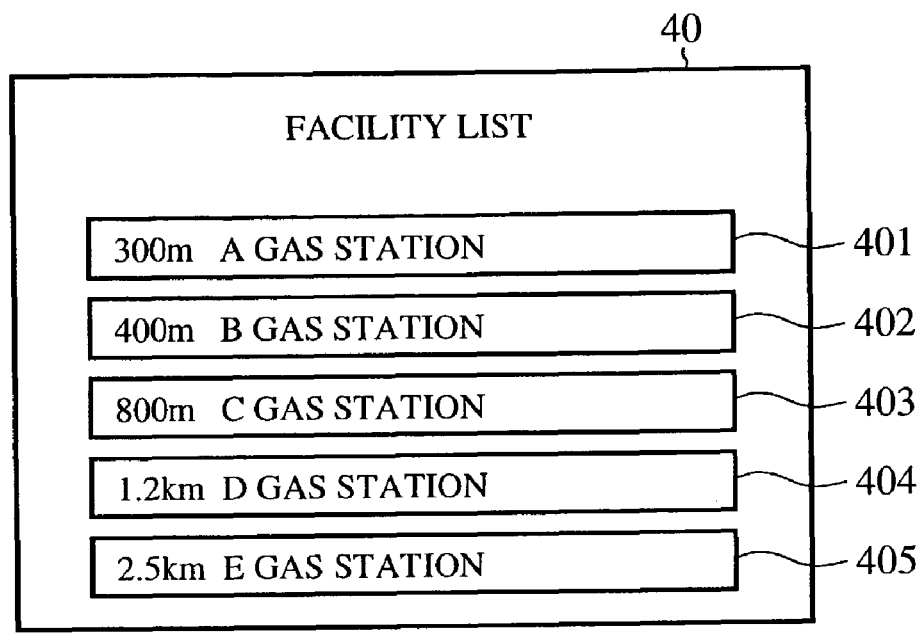
FIG. 6 is a facility list screen displayed by the display unit of the vehicle-mounted navigation apparatus.

In a facility category selection screen 30 as shown in FIG. 5, five buttons 301 to 305 that respectively represent "Search for gas stations", "Search for convenience stores", "Search for restaurants", "Search for fast food shops", and "Search for dealers" are displayed. When the user selects either of these facility categories and pushes a corresponding on-screen button (in step ST3), the road facility searching unit 12 of the facility searching device determines whether the map information storage medium 2 includes data on facilities that falls under the selected category (in step ST4). If Yes, that is, when the map information storage medium 2 includes data on facilities that falls under the selected category, the road facility searching unit 12 of the facility searching device displays a facility list screen 40 as shown in FIG. 6 (in step ST5). In this example, the user has selected the on-screen button 301 representing "Search for gas stations" in step ST3. In the facility list screen 40, A, B, C, D, and E gas stations 401, 402, 403, 404, and 405 are displayed together with their distance from the vehicle in increasing order of the distance from the vehicle. When the user determines a desired facility by pushing either of the on-screen buttons 401 to 405, the point setting unit 13 of the facility searching device displays a point setting screen 60 as shown in FIG. 8 (in step ST8).

Figure 7:
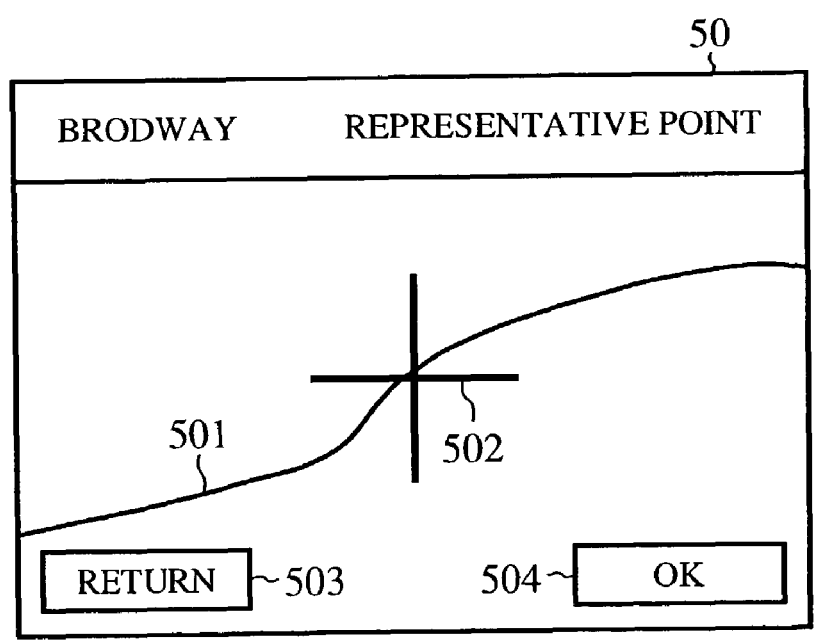
FIG. 7 is a representative point setting screen displayed by the display unit of the vehicle-mounted navigation apparatus.

When the result of the determination in step ST4 shows No, that is, when the map information storage medium 2 includes no data on facilities that falls under the category selected in the facility category selection screen 30 as shown in FIG. 5, the point setting unit 13 of the facility searching device displays a representative point setting screen 50 as shown in FIG. 7 instead (in step ST6). The point setting unit 13 of the facility searching device displays, as a representative point, a point 502 representing either an intermediate point of the road 501 in question (in this case, Broadway) or a structure that is a guide, such as a bridge or a building. When the user accepts this on-screen representative point 502 and pushes an on-screen button 504 representing "OK", the point setting unit 13 of the facility searching device displays a point setting screen 60 (in this case, "Facility: B gasoline station" is replaced by "Representative point" in the point setting screen 60) as shown in FIG. 8 (in step ST8). The user is allowed to scroll the map displayed on the representative point setting screen 50 and to change the scale of the on-screen map so that the user can select an arbitrary point on the on-screen map as the representative point.

When the user does not accept the representative point displayed on the representative point setting screen 50 and pushes an on-screen button 503 representing "Return", the CPU 1 returns to the display of the facility category selection screen 30 that allows the user to select a category of facilities again. When the user selects a category of facilities again, the road facility searching unit 12 of the facility searching device repeats steps ST3, ST4, and ST5.

Figure 8:
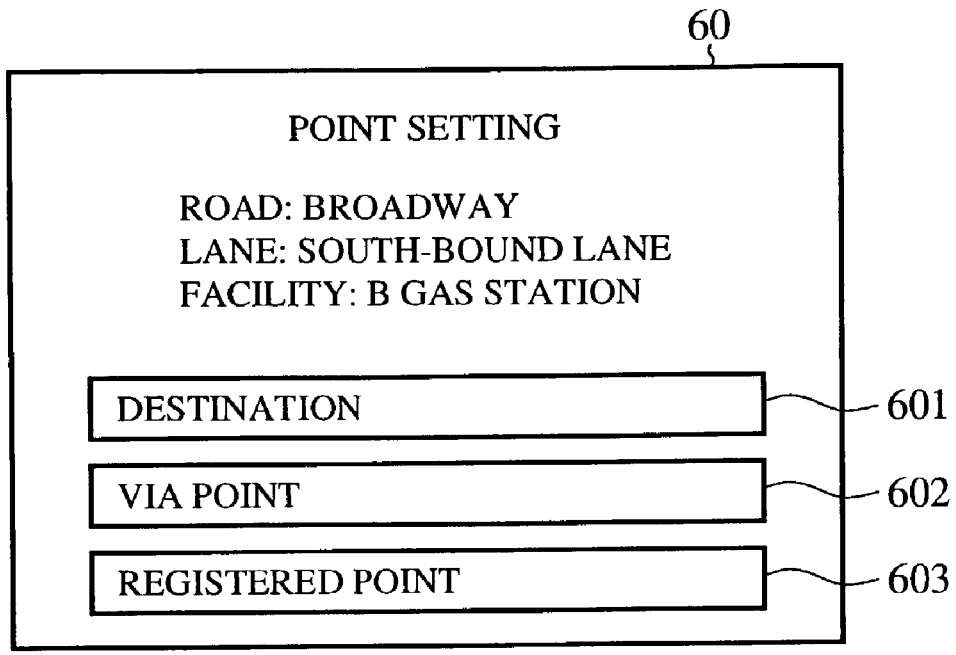
FIG. 8 is a point setting screen displayed by the display unit of the vehicle-mounted navigation apparatus.

The point setting screen 60 of FIG. 8 shows an example in which "Broadway" is selected as "Road", "South-bound lane" is selected as "Lane", and "B gasoline station" is selected as "Facility". The user is then allowed to set the selected facility or representative point to either one of a destination, a via point and a registered point in step ST8.

Figure 9:
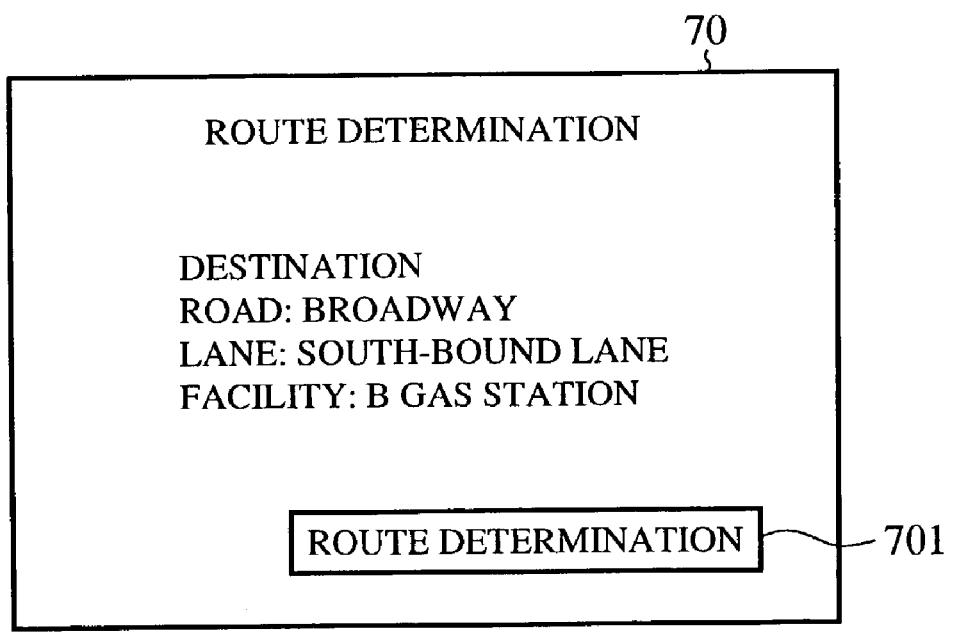
FIG. 9 is a route determination screen displayed by the display unit of the vehicle-mounted navigation apparatus.

When the user pushes an on-screen button 601 representing a destination to set the selected facility or the selected representative point to a destination, the point setting unit 13 of the facility searching device determines whether the selected facility or the selected representative point has been set as a destination (in step ST9). When the selected facility or the selected representative point has been set as a destination, the point setting unit 13 of the facility searching device displays a route determination screen 70 as shown in FIG. 9. In contrast, when the selected facility or the selected representative point has not been set as a destination, the CPU 1 returns to step ST1 and then repeats the above-mentioned steps from step ST1.

When the user pushes an on-screen button 602 representing a via point to set the selected facility or the selected representative point to a via point, the point setting unit 13 of the facility searching device sets the selected facility or the selected representative point to a via point. At this time, when no destination is set, the CPU 1 returns to the display of the road selection screen 10 as shown in FIG. 3 and searches for facilities again. When a destination has already been set, the CPU 1 displays the route determination screen 70 as shown in FIG. 9.

When the user pushes an on-screen button 603 representing a registered point to set the selected facility or the selected representative point to a registered point, the point setting unit 13 of the facility searching device sets the selected facility or the selected representative point to a registered point. At this time, when no destination is set, the CPU 1 returns to the display of the road selection screen 10 as shown in FIG. 3 and searches for facilities again. When a destination has already been set, the CPU 1 displays the route determination screen 70 as shown in FIG. 9. In the route determination screen 70 shown in FIG. 9, the road selected in step ST1, the lane selected in step ST2, and the facility selected in step ST8 (or the representative point selected in step ST7) are displayed. At this time, when the user pushes an on-screen button 701 representing route determination, the CPU 1 starts route determination. As a result, the user can acquire a route to the desired destination.

As mentioned above, in according to this embodiment 1, the facility searching device allows users to select an arbitrary road from road data stored in the map information storage medium 2 and searches for facilities located along the selected arbitrary road. Therefore, the facility searching device can search for facilities located along an arbitrary road by allowing users to select the arbitrary road regardless of whether or not a route is provided. When there are no facilities along the selected road, the facility searching device can allow users to set such a representative point as an intermediate point of the selected road or a structure that is a guide to a destination. In addition, the navigation performance of the vehicle-mounted navigation apparatus can be improved.

Many widely different embodiments of the present invention may be constructed without departing from the spirit and scope of the present invention. It should be understood that the present invention is not limited to the specific embodiments described in the specification, except as defined in the appended claims.

What is claimed is:

1. A facility searching device comprising:
    a road selecting unit for selecting an arbitrary road from road data stored in a storage unit; and
    a road facility searching unit for searching for facilities located along the arbitrary road selected by said road selecting unit;
    wherein said road selecting unit is adapted to allow a user to specify a particular direction of a lane of the selected arbitrary road so that said road facility searching unit searches for facilities located along the lane for the specified direction of the selected arbitrary road.

2. The facility searching device according to claim 1, wherein said road selecting unit specifies an inbound lane, outbound lane, east-bound lane, west-bound lane, south-bound lane or north-bound lane of the selected arbitrary road so that said road facility searching unit searches for facilities located along the specified lane of the selected arbitrary road.

3. The facility searching device according to claim 1, wherein said road facility searching unit displays a list of categories of facilities and also displays a list of facilities that fall under a category selected from the list of categories of facilities.

4. The facility searching device according to claim 1, wherein said device further comprises a point setting unit for setting one of the facilities that are searched for by said road facility searching unit to either one of a destination, a via point or a registered point.

5. The facility searching device according to claim 1, wherein said device further includes a point setting unit for, when said road facility searching unit cannot search for facilities that are located along the arbitrary road selected by said road selection unit, searching for a representative point of the selected road instead of facilities and for setting the representative point to either one of a destination, a via point or a registered point.

6. The facility searching device according to claim 1, wherein said road selecting unit is adapted to select an arbitrary road using only the road's name.

7. A facility searching method comprising:
    selecting, using a road selecting unit, an arbitrary road from road data stored in a storage unit; and
    searching, using a road facility searching unit, for facilities located along the arbitrary road selected in said road selecting;
    wherein said selecting includes specifying a particular direction of a lane of the selected arbitrary road so that said searching searches for facilities located along the lane for the specified direction of the selected arbitrary road.

8. The facility searching method according to claim 7, wherein the arbitrary road is selected using only the road's name.

9. A vehicle-mounted navigation apparatus comprising:
    a facility searching device including a road selecting unit for selecting an arbitrary road from road data stored in a storage unit and a road facility searching unit for searching for facilities located along the arbitrary road selected by said road selecting unit;
    a vehicle position determination unit for determining a current position of a vehicle;
    an input unit for inputting information from said facility searching device and information from said vehicle position determination unit; and
    a display for displaying the information from said facility searching device and the information from said vehicle position determination unit;
    wherein said road selecting unit is adapted to allow a user to specify a particular direction of a lane of the selected arbitrary road so that said road facility searching unit searches for facilities located along the lane for the specified direction of the selected arbitrary road.

10. The vehicle-mounted navigation apparatus according to claim 9, wherein said road selecting unit is adapted to select an arbitrary road using only the road's name.

11. A facility searching device, comprising:
a first processing unit for selecting an arbitrary road according to an input; and
a second processing unit for searching for facilities located along said selected road according to the input;
wherein said first processing unit further selects a particular direction of a lane of the selected arbitrary road, and in response said second processing unit searches for facilities located along the lane for the specified direction of the selected arbitrary road.

12. The facility searching device of claim 11, wherein said first and second processing units are integrally combined.

13. The facility searching device of claim 11, wherein at least one of said first and second processing units is located in a vehicle.

14. The facility searching device according to claim 11, wherein said first processing unit for selecting an arbitrary road is adapted to select an arbitrary road using only the road's name.

15. A facility searching method, comprising:
selecting, using a first processing unit, an arbitrary road according to an input; and
searching, using a second processing unit, for a facility along said selected road according to the input;
wherein said selecting includes allowing a user to specify a particular direction of a lane of the selected arbitrary road, and said searching includes searching for facilities located along the lane for the specified direction of the selected arbitrary road.

16. The facility searching method according to claim 15, wherein the arbitrary road is selected using only the road's name.

* * * * *